Sept. 25, 1962   F. W. ARMYTAGE   3,055,274
HYDRAULIC TRACERS OR DUPLICATORS FOR MACHINE TOOLS
Filed Nov. 3, 1959   3 Sheets-Sheet 1
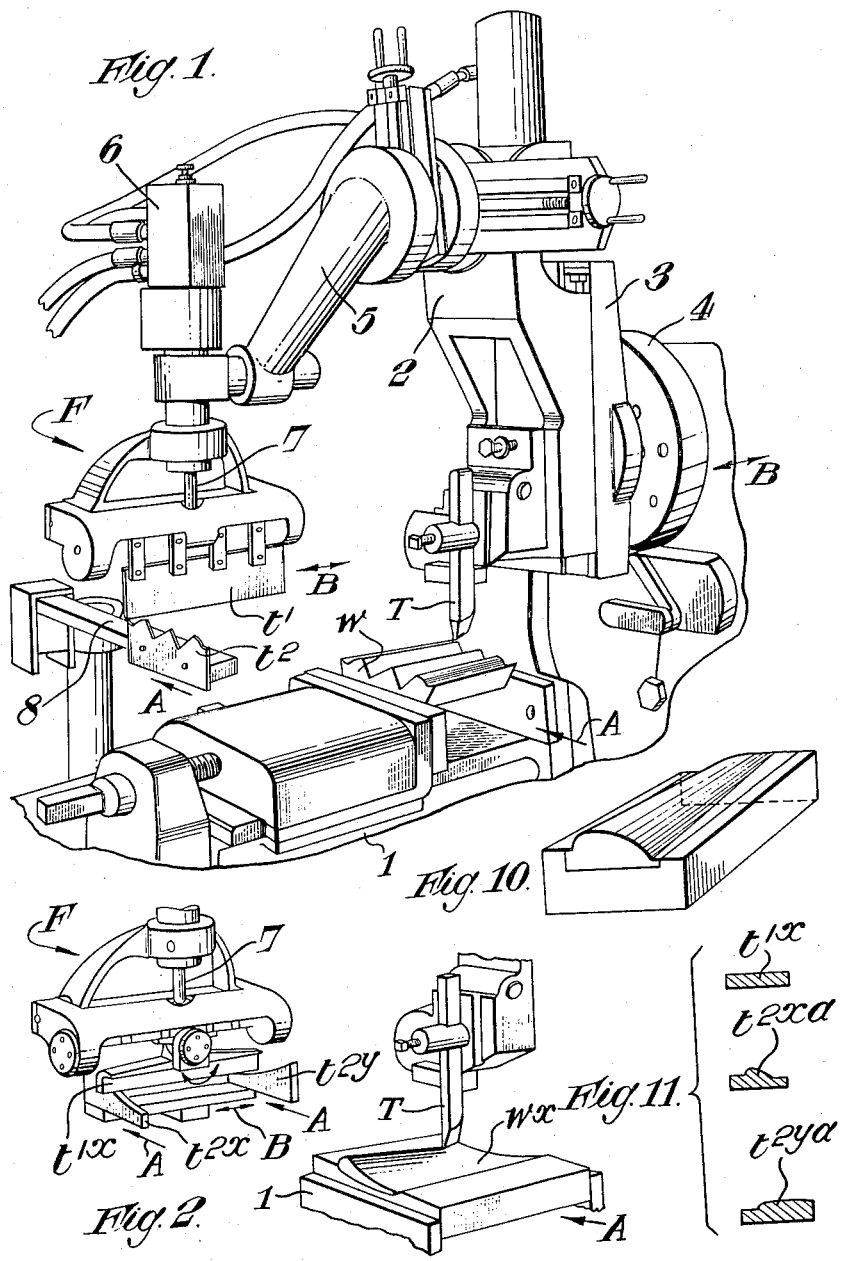

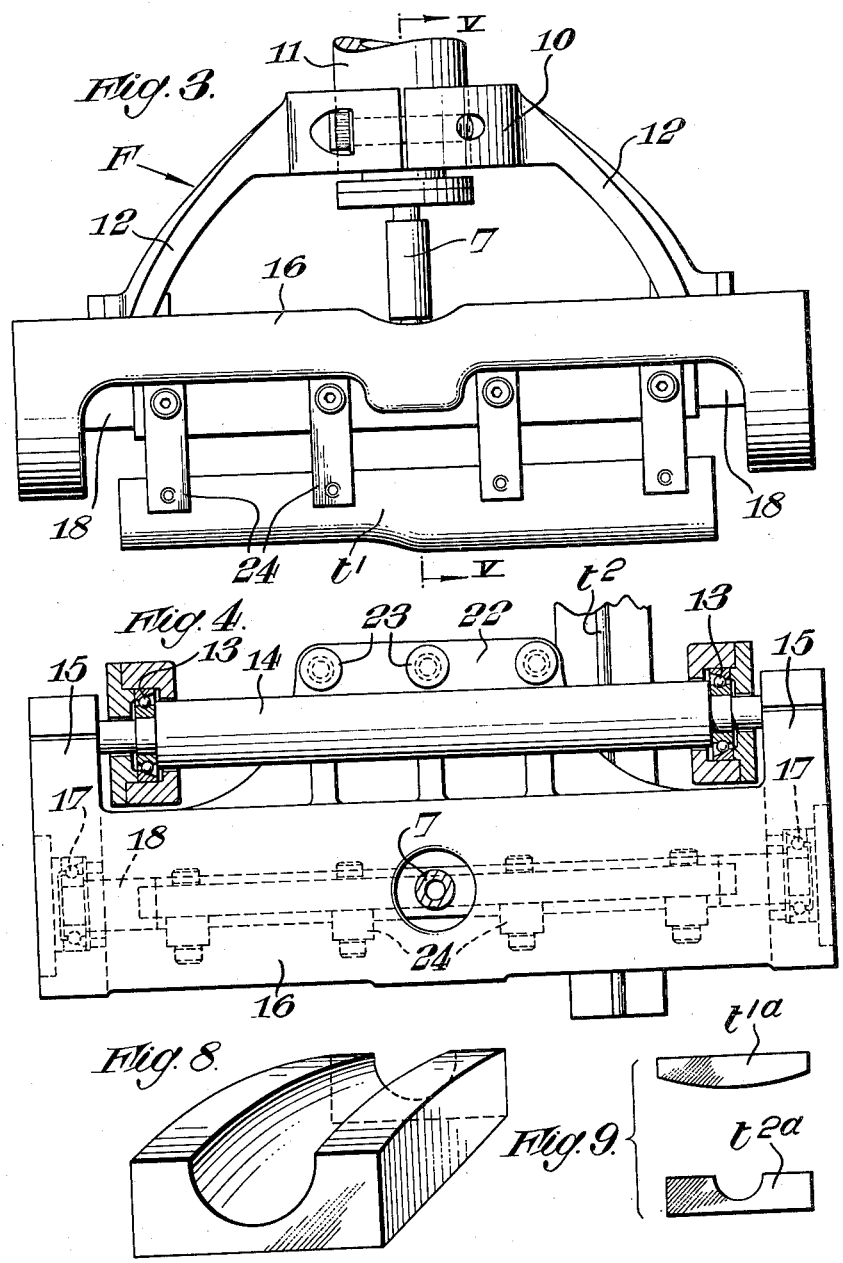

Sept. 25, 1962        F. W. ARMYTAGE        3,055,274
HYDRAULIC TRACERS OR DUPLICATORS FOR MACHINE TOOLS
Filed Nov. 3, 1959        3 Sheets-Sheet 3
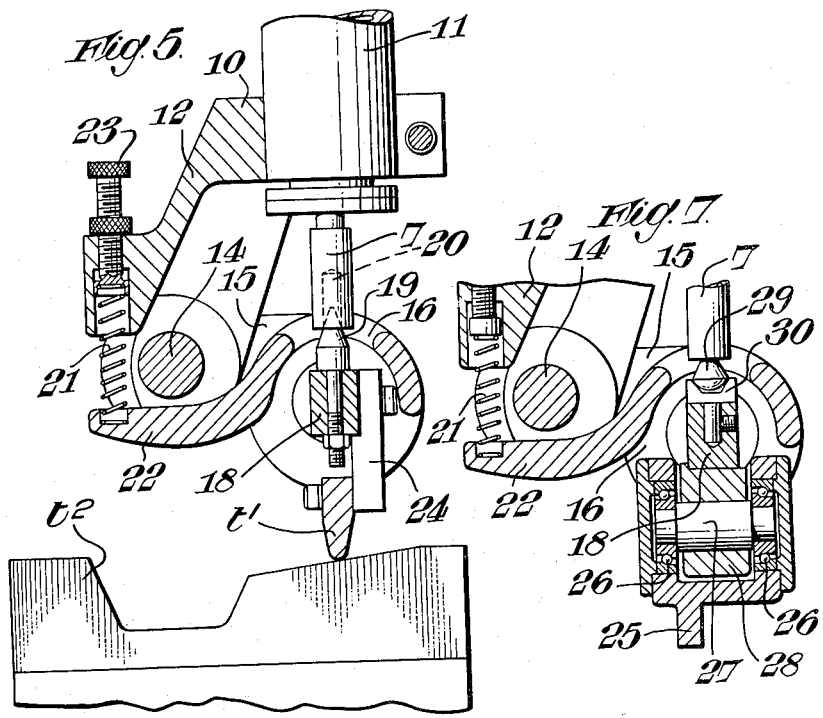
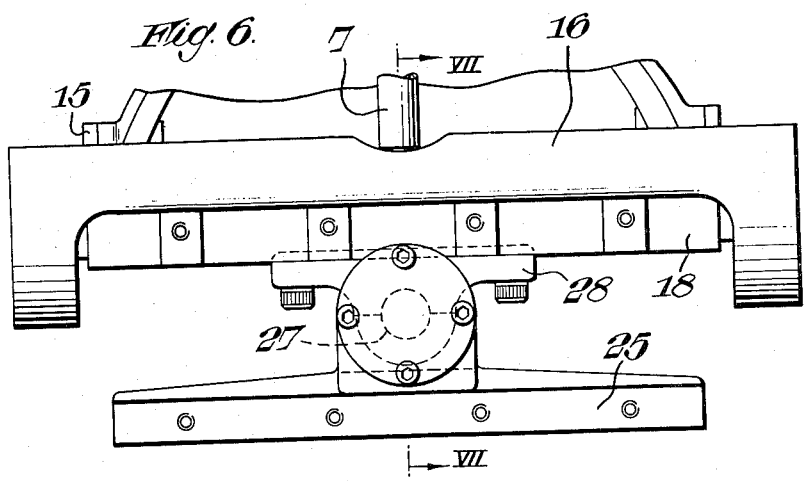

United States Patent Office 3,055,274
Patented Sept. 25, 1962

3,055,274
HYDRAULIC TRACERS OR DUPLICATORS FOR MACHINE TOOLS
Frederick William Armytage, Foundry Lane, Knottingley, England
Filed Nov. 3, 1959, Ser. No. 850,594
Claims priority, application Great Britain Nov. 4, 1958
2 Claims. (Cl. 90—24.3)

The invention relates to hydraulic tracers and duplicators for machine tools, and of the kind wherein the movement of a stylus which follows the contours of a template or pattern actuates a hydraulic tracer valve which controls the flow of pressure fluid to and from a ram cylinder to produce a corresponding relative movement between the cutting tool and the workpiece.

At present in using such tracers to produce a three-dimensional shape it has been necessary or usual to have a model or master of the workpiece to be produced over which the stylus foot is systematically traversed. In the case of articles with complicated three-dimensional contours which must be machined to extremely accurate limits (e.g. turbine blades) the production of the model or master itself is often an extremely costly and lengthy procedure and the fact that the blades in a turbine may be of many different contours aggravates the cost and time required in the production of blades.

Hitherto it has been the custom to use a stylus foot with a contour or shape matching that of the cutting tool, but it has not been possible to introduce a second dimension on to the stylus to enable a contour to be produced using the stylus as a template as well as a matched form of the cutting tool.

The chief object of the present invention is to provide a duplicating method, and a tracer-actuating mechanism for use according thereto, which will enable three-dimensional contours to be cut by the use of templates only instead of a pattern or master, templates being comparatively simple and cheap to make.

A further object of the invention is to enable such contours to be cut from two or three templates on single-point tool cutting machines such as shaping, planing or turning machines having reciprocating or rotary actions, or machines with rotary cutters.

With these objects in particular in view the present invention in its broadest aspect consists in a method of duplicating three-dimensional forms or contours on machine tools by means of a hydraulic tracer of the kind herein set forth, which method consists in using at least two templates shaped respectively to conform to the contours of the form to be produced in at least two dimensions, mounting one template to be movable with the workpiece (or tool) and the other to be traversible with the tool (or workpiece) and arranging for one of said templates to be capable on deflection of actuating the tracer valve, and traversing and reciprocating one template across and in contact with the other template in duplication of the relative movements between the tool and the workpiece.

By this method one template (hereinafter called the "tracer" template) takes the place of the stylus foot and is deflected by its varying contact with the other template. Where the contour of the form or article to be produced varies across the path of relative movement between the tool and the workpiece, the tracer template will be arranged to operate in conjunction with two spaced apart templates representing the contours at the two ends of the article and will be arranged to maintain contact with both. The different ways of applying the method of the invention will become apparent from the ensuing description.

From another aspect of the invention this consists in a tracer-actuating mechanism which is mounted to be reciprocated (relative to the workpiece) longitudinally with the cutting tool and in which the stylus is arranged to be moved by the deflections of a longitudinal tracer template caused by longitudinal reciprocation of said template relatively to and in contact with and across at least one lateral template which is arranged to be moved with the workpiece relative to the tool, the templates representing respectively the contours, in at least two planes at right angles to one another, of the article to be produced.

The terms "longitudinal" and "lateral" are used in this specification in relation to the relative longitudinal reciprocating movements between the tool and the workpiece.

In order that the invention may be clearly understood and readily carried into effect the same will now be more fully described with reference to and by the aid of the accompanying drawings, which illustrate merely by way of example certain practical applications of the method of the invention and certain embodiments of mechanism for carrying the method into practice.

In these drawings:

FIGURE 1 is a perspective view illustrating the application of the invention with two templates to a shaping machine, only such parts of the machine being indicated as are necessary to a proper understanding of the invention;

FIGURE 2 is a view similar to FIGURE 1, but omitting (for simplicity) the tracer valve, valve support, tool slide and tool reciprocating ram, illustrating the application of the invention with three templates to produce an article of more complicated contours.

FIGURES 3 and 4 are respectively an elevation and plan, with portions of the latter shown in section, of one construction of tracer-actuating mechanism according to the invention adapted for operating with two templates;

FIGURE 5 is a section taken on the line V—V in FIGURE 3;

FIGURE 6 is a view similar to FIGURE 3 with the upper part omitted, but showing a modified construction adapted for operating with three templates;

FIGURE 7 is a section taken on the line VII—VII in FIGURE 6;

FIGURES 8 and 9 illustrate respectively one example of a shape or form which can be produced by this invention and the two templates required to produce it;

FIGURES 10 and 11 illustrate similarly to FIGURES 8 and 9 a more complicated shape or form and the three templates required to produce it.

Referring first to FIGURE 1, a workpiece $w^1$ is secured on the shaper worktable 1. A tool T is secured in a vertically movable tool slide 2 whose slideway 3 is mounted in the machine for horizontal and longitudinal reciprocation by a shaper ram 4, the slide supporting a tracer arm 5 carrying a tracer valve 6 with stylus rod 7. The construction and arrangement of these parts is well known in shaping machines and needs no further description. The tracer arm also supports a frame generally indicated by F in which is mounted a longitudinal tracer template $t^1$ capable of being deflected vertically and also laterally and of actuating the stylus rod. The template $t^1$ has its lower edge profiled to correspond with the desired longitudinal contours of the workpiece (straight in this illustration) and it is reciprocated longitudinally in contact with and across a lateral template $t^2$ whose upper edge is profiled to correspond with the desired lateral contour of the workpiece. The template $t^2$ is mounted on a support member 8 attached to the worktable so that this template and the worktable move laterally intermittently in the direction of the arrows A (or in the reverse direction).

As the tool T and template $t^1$ are reciprocated as shown by arrows B by the shaper ram 4 the straight profile on the template causes the tool to cut in a horizontal straight line, producing a lateral contour only as illustrated in FIGURE 1. But by using a longitudinal template with a varying profile it will cause the tool to produce a longitudinal contour also, although this contour will be the same for every stroke of the tool right across the workpiece laterally.

Thus two templates can be used for extrapolating on any given lateral profile with either a straight or contoured longitudinal profile. This is illustrated in FIGURES 8 and 9 which show an example of a form having such a combination of contours, together with a lateral template $t^{2a}$ and a longitudinal template $t^{1a}$ which will produce this form.

In the modified arrangement illustrated in FIGURE 2 wherein like parts to those in FIGURE 1 are indicated by like reference numerals and letters, the longitudinal template $t^{1x}$ is mounted for pivotal movement in the frame F in a vertical longitudinal plane and is arranged to be reciprocated in contact with and across two spaced apart lateral templates $t^{2x}$ and $t^{2y}$, which are arranged to move laterally with the workpiece, and which correspond respectively in profile with the lateral contours of the two opposite ends of the workpiece $w^x$ such as the turbine blade shown in FIGURE 2. As these two lateral templates have different profiles the longitudinal template will be rocked and will cause the tool to produce a longitudinal contour varying laterally across the workpiece in accordance with the contour whose ends are defined by the two lateral templates. Thus three templates can be used to reproduce accurately complicated three-dimensional contours by interpolating from one profile to another with either a straight or a contoured longitudinal profile.

This use of three templates is illustrated in FIGURES 10 and 11 which show another example of an aerofoil shape or form of article together with the templates $t^{1x}$, $t^{2xa}$ and $t^{2ya}$ which will produce this form.

The construction of the tracer-actuating mechanism for carrying out this invention may vary according to the kind of machine tool or tracer head used, but the following description referring to FIGURES 3 to 7 of its application to a shaping or planing machine will serve as examples.

In FIGURES 3 to 5 there is shown a main bracket 10 adapted to be clamped round the tracer head 11. This bracket has two arms 12, 12 supporting ball thrust bearings 13, 13 which carry a freely rotatable pivot shaft 14 on the ends of which are clamped the arms 15, 15 of a rocker support 16 extending longitudinally beneath the stylus rod 7. The rocker support 16 also has ball thrust bearings 17, 17 which carry an angularly rockable shaft or bar 18 from the centre of the upper side of which projects a conical nosed actuator 19, adapted to engage a recess 20 in the stylus rod so that vertical or lateral movement of the rocker shaft 18 will actuate the tracer valve 6. The conical nosed actuator 19 is held in contact with the stylus by pressure of compression coil springs 21 mounted between an arm 22 on the pivot shaft 14 and pressure adjusting screws 23 carried in the main bracket 10. These springs act to counterbalance the weight of the parts hanging under the stylus to render the mechanism sensitive, since it is necessary that this mechanism should be capable of deflection by very light pressure on the longitudinal template.

Brackets 24 secured to the rocker shaft 18 carry below the latter the longitudinal template $t^1$ whose lower horizontal edge is slightly rounded (to match the tool) and contacts the lateral template so as to be reciprocated at 90° thereto.

The result of this mechanism is to produce deflection on the stylus from the two templates in a vertical and lateral direction but to hold it rigidly longitudinally so that any frictional drag between the two templates is taken on the thrust bearings. By this means the stylus rod need not be directly over the point of contact between the templates, and accuracy can be maintained irrespective of the length of the longitudinal template, which length will be greater than the desired stroke of the tool.

The tracer valve and stylus mounting and the mechanism interconnecting these, may be similar to those disclosed in the specifications of my prior British Patent No. 692,642 and my prior British Patent Nos. 859,474 and 860,967 but other forms may be used with the actuating mechanism of this invention provided they give the necessary accuracy of duplication.

In the modified construction of FIGURES 6 and 7 and FIGURE 2, the longitudinal template is secured to a holder 25 which is mounted by roller bearings 26 on a stud axle 27 mounted in a bracket 28 secured on the rocker shaft 18 to be capable of rocking or swivelling about a horizontal transverse axis of axle 27 passing below the stylus 7. By this means the longitudinal template can rock in the vertical plane in which it is reciprocated across the two lateral templates as explained with reference to FIGURE 2.

This enables the tool to be moved vertically during its cutting strokes to produce a more complicated contour as dictated by the three templates co-operating with one another.

In FIGURE 7 a modified contact means is shown between the rocker bar 18 and the stylus 7 consisting of a part-spherical foot 29 secured on the stylus engaging a cup 30 secured on the rocker bar 18. However, any other suitable contact means can be used for transmitting the deflections of the rocker bar to the stylus.

Although this invention has been illustrated as applied to a shaping machine in which the tool is reciprocated at right angles to the path of the intermittently moved workpiece, it must be understood that the necessary relative movements between the tool and the workpiece may be produced in other ways according to requirements or to the kind of machine tool concerned, always provided that corresponding relative movements are produced between the tracer template and its co-acting template or templates.

I claim:

1. An apparatus for duplicating three dimensional contours of forms on machine tools fitted with a cutting tool comprising in combination a movable hydraulic tracer head, a frame mounted on said head to move said head longitudinally with the cutting tool, a hydraulic tracer valve in said tracer head, a stylus extending from said tracer head and operatively connected to said valve which is adapted to follow the contour of a pattern to actuate said hydraulic tracer valve, a hydraulic reciprocating mechanism including a hydraulic conduit, a ram cylinder actuated by said valve for producing movement between the cutting tool and workpiece, a rocker support pivotally mounted in said frame and a rocker shaft pivotally mounted in said rocker support, a stylus actuator secured on said rocker shaft and operatively connected to said stylus, a longitudinally extending tracer template profiled with the longitudinal profile of the work serving as a foot for said stylus to move said stylus with the tool, mounting means for pivotally mounting said tracer template intermediate of its ends which is secured on said rocker shaft to permit the template to rock in a vertical longitudinal plane, two spaced-apart lateral templates each of which is profiled at opposite sides of the work representing respectively the lateral contours of said article at the two ends thereof between which the tool reciprocates relative to the workpiece, both of said lateral templates being mounted to be movable with the work, the pivotal axes of said rocker support and said rocker shaft being parallel to the plane of said longitudinal tracer template while the axis of the stylus rod and the pivotal axis of said rocker shaft lie in the same longitudinal plane as the profile edge of said longitudinal template when said template is not deflected, said tracer template reciprocating across said two spaced-apart templates and being rockable in a vertical plane to produce the desired tracing action by actuating said tracer valve through said stylus and means to hold said rocker support rigid against longitudinal vertical movement while permitting it to be deflected vertically or laterally irrespective of the distance through which the cutting tool passes under actuation by said stylus.

2. An apparatus for duplicating three dimensional contours of forms on machine tools fitted with a cutting tool comprising in combination, a movable hydraulic tracer head, a frame mounted on said head to move said head longitudinally with the cutting tool, a hydraulic tracer valve in said tracer head, a stylus extending from said tracer head and operatively connected to said valve which is adapted to follow the contour of a pattern to actuate said hydraulic tracer valve, a hydraulic reciprocating mechanism including a hydraulic conduit, a ram cylinder actuated by said valve for producing movement between the cutting tool and workpiece, a rocker support pivotally mounted in said frame and a rocker shaft pivotally mounted in said rocker support, a stylus actuator secured on said rocker shaft and engaging said stylus to activate it, a longitudinally extending tracer template profiled with the longitudinal profile of the work and serving as a foot for said stylus and secured on said rocker shaft to move said stylus actuator vertically and angularly in a lateral direction and thereby activate said stylus, a lateral template profiled with the lateral profile of the work and mounted to be movable with the work, said tracer template reciprocating across and in contact with said lateral template to produce the desired tracing action by actuating said tracer valve through said stylus, and means to hold said rocker support rigid against longitudinal movement while permitting it to be deflected vertically or laterally irrespective of the distance through which the cutting tool passes under actuation by said stylus.

References Cited in the file of this patent
UNITED STATES PATENTS

| | | |
|---|---|---|
| 2,549,024 | Siepe | Apr. 17, 1951 |
| 2,933,985 | Zwick et al. | Apr. 26, 1960 |